Patented Sept. 20, 1949

2,482,512

UNITED STATES PATENT OFFICE 2,482,512

PROCESS OF MANUFACTURING 3,3'-CARBOXYMETHYLENEBIS - (4 - HYDROXYCOUMARIN) COMPOUNDS FOR THE REDUCTION OF THE PROTHROMBIN LEVEL

Jan Rosický, Prague, and Karel Fučik, Prague-Modrany, Czechoslovakia, assignors to Spojene Farmaceuticke Zavody, Narodni Podnik, Prague, Czechoslovakia, a corporation of Czechoslovakia No Drawing. Application February 14, 1947, Serial No. 728,720. In Czechoslovakia August 31, 1946

3 Claims. (Cl. 260—344.6)

In copending United States patent applications, Ser. Nos. 728,714 and 728,715, respectively filed on February 14, 1947, one of us has disclosed processes of manufacturing compounds which reduce the prothrombin level of the blood. For the manufacturing of these compounds, an ester, particularly a lower alkyl ester, such as the ethyl ester, of the glyoxylic acid or its alcoholate, is condensed with 4-hydroxycoumarin. More specifically the aforesaid application Serial No. 728,714 is concerned with the condensing of benzotetronic acid or 4-hydroxycoumarin with glyoxylic acid ethyl ester whereas application Serial No. 728,715 is concerned with the condensing of 4-hydroxycoumarin with glyoxylic acid ethyl ester ethyl alcoholate.

The compounds disclosed, such as 3,3'-carboxymethylene ethyl ester-bis-(4-hydroxycoumarin), are characterized by their quick action on the prothrombin level, which sets in already after two to three hours after administration, and also, thereafter, by their quick elimination from the organism. The physician by properly dosing these compounds may thus keep the prothrombin level of the blood elastically on the desired height, a fact which is of great importance for the practical application of these compounds in therapeutics.

The object of this invention is a new process for the manufacture of the 3,3'-carboxymethylene-bis-(4-hydroxycoumarin) esters, particularly the lower alkyl esters thereof, a process, which at the same time facilitates the manufacture of the various homologues of the compound, all of which show very advantageous and valuable characteristics concerning the control of intensity and duration of their effect on the prothrombin level.

In the process of our invention, for the manufacture of the 3,3'-carboxymethylenebis-(4-hydroxycoumarin) lower alkyl esters, we start from the free 3,3'-carboxymethylenebis-(4-hydroxycoumarin), of the structural formula:

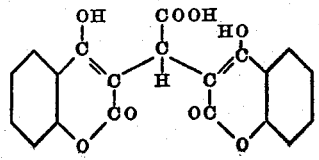

This compound may for instance be produced by condensing two molecules of 4-(hydroxycoumarin)

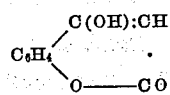

with one molecule of glyoxylic acid: $OCH \cdot CO_2H$.

This 3,3'-carboxymethylenebis - (4 - hydroxycoumarin) is condensed in accordance with the invention, with a lower aliphatic alcohol. In this reaction exclusively the carboxylic function of the 3,3'-carboxymethylenebis - (4 - hydroxycoumarin) is esterified, but not the hydroxyl groups within the 4-hydroxycoumarin radical.

This result is best achieved by esterification by means of a lower aliphatic alcohol at elevated temperature and in the presence of dry hydrochloric acid as a dehydrating condensing agent.

The esters so obtained are colorless crystals which are insoluble in water but soluble in acetone, and in most cases are obtainable in two tautomeric forms which may be manufactured in pure condition. Thus, for instance, with the ethyl ester of the 3,3'-carboxymethylenebis-(4-hydroxycoumarin) the tautomeric derivative of lower melting point melts at 149° C., while that of higher melting point melts at 173° C. Through crystallization from an appropriate solvent the one form may be converted into the other and conversely.

Furthermore, it was observed that, at the esterification, higher concentration of the hydrochloric acid and longer duration of the heating result in tautomeric derivatives of higher melting points. Through re-crystallization from acetone these derivatives of higher melting points may be converted into such of lower melting points.

For further illustration of the invention, we are now giving some examples for the manufacture of esters of the bis-4-oxycoumarinyl acetic acid. It will be readily understood however that these examples are illustrative of the invention but not limitative of its scope.

Example 1

2 gm. of 3,3'-carboxymethylene-bis-(4-hydroxycoumarin) are dissolved in 26 cc. of a normal solution of ethyl-alcoholic hydrochloric acid at 60° C. and kept at this temperature for 22 hours. The ethyl ester of the bis-4-oxycoumarinyl acetic acid which crystallizes out from the solution is filtered at the pump and washed out by means of ethyl alcohol.

Yield: 1.8 gm. 3,3'-carboxymethylene ethyl ester-bis-(4-hydroxycoumarin) of a melting point of 148° C.

*Example 2*

2 gm. of 3,3'-carboxymethylene-bis-(4-hydroxycoumarin) are dissolved in 30 cc. of a normal solution of ethyl-alcoholic hydrochloric acid and the solution boiled for five hours at the back-flow condenser.

Yield: 1.85 gm. 3,3'-carboxymethylene ethyl ester-bis-(4-hydroxycoumarin) of a melting point of 148 to 149° C.

*Example 3*

2 gm. of 3,3'-carboxymethylene-bis-(4-hydroxycoumarin) are dissolved in 26 cc. of a 9.22 normal solution of ethyl-alcoholic hydrochloric acid and the solution heated to 60° C. for 48 hours.

1.8 gm. of 3,3'-carboxymethylene ethyl ester-bis-(4-hydroxycoumarin) of a melting point of 173 to 175° C. crystallize out. After re-crystallization from a solution in 10.8 gm. of acetone the melting point of the compound decreases to 148 to 149° C.

*Example 4*

2 gm. of 3,3'-carboxymethylene-bis-(4-hydroxycoumarin) are dissolved in 35 cc. of a normal solution of methyl-alcoholic hydrochloric acid and the solution boiled for five hours at the back-flow condenser.

3,3'-carboxymethylene methyl ester-bis-(4-hydroxycoumarin) crystallizes out in colorless crystals of a melting point of 202 to 203° C.

Similarly, by processes analogous to those described in the foregoing examples, other, homologous esters may be produced, such as the 3,3'-carboxymethylene-n-propyl ester - bis - (4 - hydroxycoumarin) in white crystals of a melting point of 139 to 141° C., or the 3,3'-carboxymethylene-n-butyl-ester-bis-(4 - hydroxycoumarin) in small colorless crystals of a melting point of 155° C.

The homologous esters of the 3,3'-carboxymethylene-bis-(4-hydroxycoumarin) are of an effect on the prothrombin level of the blood analogous to the effect exemplified in the chart of the aforesaid patent application Ser. No. 728,714 with regard to the 3,3'-carboxymethylene ethyl ester-bis-(4-hydroxycoumarin).

We claim:

1. The process of manufacturing compounds for the reduction of the prothrombin level of the blood which includes the step of condensing 3,3'-carboxymethylenebis - (4 - hydroxycoumarin) at elevated temperature with a lower aliphatic alcohol having a number of carbon atoms of one to four and thereby esterifying exclusively the carboxylic function of said 3,3'-carboxymethylene-bis-(4-hydroxycoumarin).

2. The process of manufacturing compounds for the reduction of the prothrombin level of the blood which includes the step of condensing 3,3'-carboxymethylenebis - (4 - hydroxycoumarin) at elevated temperature in the presence of a dehydrating condensing agent with a lower aliphatic alcohol having a number of carbon atoms of one to four and thereby esterifying exclusively the carboxylic function of said 3,3'-carboxymethylenebis-(4-hydroxycoumarin).

3. The process of manufacturing compounds for the reduction of the prothrombin level of the blood which includes the step of condensing 3,3'-carboxymethylenebis - (4 - hydroxycoumarin) at elevated temperature in the presence of hydrochloric acid as a dehydrating condensing agent with a lower aliphatic alcohol having a number of carbon atoms of one to four and thereby esterifying exclusively the carboxylic function of said 3,3'-carboxymethylenebis-(4 - hydroxycoumarin).

JAN ROSICKÝ.
KAREL FUČÍK.

REFERENCES CITED

The following references are of record in the file of this patent:

Russell et al., J. Am. Chem. Soc. 64, 2274–5 (1942).

Sullivan et al., J. Am. Chem. Soc. 65, 2290 (1943).